United States Patent [19]

Pfeiffer

[11] 3,914,154
[45] Oct. 21, 1975

[54] METHOD AND DEVICE FOR THE PRODUCTION OF LAYERED PRESSED PANELS

[75] Inventor: Heinrich Pfeiffer, Eppingen, Germany

[73] Assignee: Maschinenfabrik J. Dieffenbacher & Co., Eppingen, Germany

[22] Filed: June 10, 1974

[21] Appl. No.: 477,993

[30] Foreign Application Priority Data
June 8, 1973   Germany............................ 2329267

[52] U.S. Cl. ............. 156/557; 156/563; 214/8.5 D; 270/58; 271/9; 271/14
[51] Int. Cl.² ...................... B32B 31/00; B65H 5/08
[58] Field of Search ........... 156/556, 557, 559, 563, 156/570; 214/8.5 D; 271/9, 14, 196, 212; 270/58

[56] References Cited
UNITED STATES PATENTS

| | | | |
|---|---|---|---|
| 3,334,891 | 8/1967 | Clausen et al. ......................... | 271/9 |
| 3,516,653 | 6/1970 | Bland................................. | 156/563 |
| 3,517,835 | 5/1968 | Temple............................ | 214/8.5 D |
| 3,603,463 | 9/1971 | Billett ................................ | 156/563 |
| 3,830,489 | 8/1974 | Adams............................... | 156/563 |

Primary Examiner—Douglas J. Drummond
Attorney, Agent, or Firm—Joseph A. Geiger

[57] ABSTRACT

A method and device for assembling a plurality of layers into a package for the fabrication of layered pressed composite panels by collecting the top layers from a succession of delivery stacks with a collecting palette travelling on a collecting carriage, the layers being lifted by one edge, whereupon the collecting palette, with any other layers already collected, is inserted underneath the partially lifted layer. The collected package, or collected packages, from several collecting lines are then deposited onto an assembly table or an assembly conveyor feeding them to a panel press.

15 Claims, 4 Drawing Figures

METHOD AND DEVICE FOR THE PRODUCTION OF LAYERED PRESSED PANELS

BACKGROUND OF THE INVENTION

1. Field of the Invention

The present invention relates to a method and device for the production of layered pressed panels, and in particular to a method and device for the assembly of a plurality of layers in the production of decorative panels or of veneer panels, chipboard panels, fiber panels, metal-composite panels, plastic panels and plywood panels, in conjunction with a panel press installation, where vertically movable suction means singulate cover layers and carrier panels from separate delivery palettes, and the singulated layers are collected and conveyed horizontally to an assembly table.

2. Description of the Prior Art

The mechanization of the production of composite layered panels has not only brought with it a great variety of new applications and the use of new panel materials, it has also shown the need for more efficient methods and devices for the collection and assembly of the various panel components. In general, this concern for higher production efficiency applies to either the application of special cover layers or skins to carrier panels, as in veneer panels, chipboard panels, fiber panels and plywood panels, the skin being, for example, a hardwood veneer, paper, plastic material, etc., or the assembly of translucent or transparent layered panels, sound-absorbing panels, furniture panels, and other sandwiched panels. The final assembly of these panels may be performed in a single-level heater panel press, or a multi-level heater panel press.

Known methods for the production of such composite panels are designed to operate semi-automatically or fully automatically, featuring a vertically movable suction plate on a carriage which runs along guide rails to the delivery palettes to pick up a panel layer and to bring it to the assembly table where it is then deposited. A particular problem is encountered in connection with panels which are so large that they can only be assembled without damage with fully automated panel assembly equipment. In part because of the greater conveying distances, the time required for the assembly of these large panels becomes too long, especially in the case of multi-level panel presses, to a point where it exceeds the minimum cycle time of the press. In order to compensate for this lost time and in an effort to eliminate idle time of the panel press, which is by far the most expensive unit of a panel fabricating installation, a system is presently in use where several assembly stations with separate delivery carriages are combined in a single panel layer assembly line, the separate tracks for the assembly stations being joined in front of the panel press.

Among the shortcomings of this last-mentioned approach are the complexity and cost of the multiple layer collecting devices and its need for a large amount of floor space. In the case of panels having two or more inner panel plies and two or more cover layers on both sides, it is no longer possible with the presently known method to take advantage of the optimal curing time for the resin binder between the layers.

SUMMARY OF THE INVENTION

It is a primary objective of the present invention to provide an improved layer collecting method and device for the automatic production of pressed panels at a high production rate and at operative reliability, the device being simple in structure and consequently manufacturable at reasonable costs, so that a single assembly station can feed to the panel press enough layer packages for panels composed of carrier panels and cover layers, or other multi-layer panels, even at the minimal cycle time of the press.

In order to attain the above objective, the present invention suggests a panel layer collecting system in which the uppermost layer of each of several successively arranged layer stacks on separate delivery palettes is lifted by one edge, whereupon a collecting palette engages the partially lifted layer from underneath, collecting one layer from each delivery palette, the collected layers being deposited on an assembly table as a package. The novel layer collecting system of the invention, by greatly reducing the time required for bringing the various panel layers to the assembly table, increases the output capacity of a given panel fabricating installation, inasmuch as the panel heater press is much better utilized.

One important advantage of this assembly method is the fact that the panel layers which are stacked on the successive delivery palettes are lifted simultaneously before arrival of the collecting palette which moves from stack to stack, picking up one layer after the other, and reversing its motion only when the collected layer package is to be carried to the assembly table. Compared to previously known assembly systems, this novel collecting method is obviously much less time consuming, especially when, as further suggested, several collecting palettes feed cover layers or carrier panels to a common assembly table or to separate assembly tables serviced by an assembly conveyor. In the case where only a single cover layer is to be applied to the upper and lower sides of the panel, a plurality of panels can be assembled for the several levels of the press, thereby greatly increasing the output of the installation.

A preferred device for the implementation of the novel method of the invention includes a series of two or more layer stacks on delivery palettes, each having associated with it a vertically movable suction bank on the side facing towards the assembly table, the suction bank carrying a series of suction heads adapted to lift the edge of the uppermost layer, while the major portion of the layer remains supported on the layer stack on top of the delivery palette. A collecting palette on a carriage moves over a series of delivery palettes and back to an assembly table along a collecting line which is perpendicular to the feed axis of the panel press, the collecting palette moving underneath the lifted edge of each layer, as it approaches a delivery palette, so that each layer is deposited on top of the collecting palette, which may already carry one or more layers. The collecting carriage is stopped in each instance by an abutment switch, whereupon the layer is released from the suction bank and the collecting palette advances to the next delivery palette. As soon as the layer package on the collecting palette is complete, the carriage moves back over the delivery palette to the assembly table where the package is deposited in order to be assembled with the other panel components.

In a preferred embodiment of the invention the collecting palette is attached to a carriage which is suspended on two spaced overhead rails, the carriage having spaced vertical brackets arranged to run laterally outside the delivery palettes and the assembly table. Between the spaced overhead rails guiding the carriage brackets are arranged the stationary supports for the vertically movable suction banks which are positioned above the near edge of each delivery palette. Each of these suction banks carries a plurality of suction heads. Thus, the collecting carriage moves outside the suction banks and the collecting palette itself passes underneath the raised suction heads.

As a cover layer is picked up by the collecting palette, the leading edge of the latter progressively lifts the layer from the stack on the delivery palette. In order to facilitate this lifting action, the collecting palette preferably has an inclined guide clamp or a guide roller on its leading edge which lifts the cover layer as the collecting palette, with or without previously collected cover layers, passes under it.

Once the collecting carriage has assembled a complete layer package on its collecting palette, it moves back over the line of delivery palettes to the assembly table, passing underneath the raised suction bank of each delivery palette. As soon as the collecting palette is in place above the assembly table, one edge of the layer package is seized by a transfer clamp attached to the assembly table, the transfer clamp having preferably a continuous upper lip and a plurality of spaced lower clamping jaws for which matching recesses are arranged in the collecting palette. With the transfer clamp closed, the collecting carriage can be withdrawn for a new collecting run, while the package of cover layers remains on the assembly table.

In a further development of the invention, it is suggested to provide two layer collecting lines and two collecting carriages on opposite sides of an assembly table, each collecting carriage serving a plurality of delivery palettes. In this case, the assembly table has two transfer clamps, one on each side, and the clamps are arranged to be pivoted out of their normal vertical alignment after a layer package is deposited. Such an arrangement makes it possible to quickly and reliably collect a variety of layers from a number of delivery palettes and to deposit them in the desired composition onto the assembly table. For example, it is thus possible to assemble a lower cover layer package from one side of the assembly table and an upper cover layer package from the other side. Of course, a number of different layer combinations is possible with this arrangement. When carrier panels are incorporated in the assembly, they are deposited on the assembly table following transfer of the bottom cover layers, but before the top cover layers are deposited on it. A single collecting carriage may also be arranged to collect layers from two collecting lines at opposite sides of the assembly table.

In certain cases, however, the number of different layers to be collected from separate delivery palettes, even when arranged on opposite sides of the assembly table, is so large as to make the space requirement of the assembly line, or lines, impractical, especially when limits to the available floor space are set by the building or by other circumstances. This disadvantage can be overcome in a further development of the invention where several parallel assembly lines feed to adjacent assembly tables at right angles to the feed axis of the panel press, the assembly tables being preferably linked by an assembly conveyor. In this case each assembly line covers a plurality of delivery palettes and has its own collecting carriage cooperating with appropriate transfer clamps on its assembly table. This arrangement, though extending the length of the overall installation, greatly reduces its width. A preferable arrangement of this kind, for example, may include a first assembly line in which the bottom cover layer package is placed onto the assembly conveyor, a second line in which the carrier panel, or panels, are placed on top of the bottom cover layers, and a third assembly line in which a top cover layer package is collected and placed on top of the carrier panels on the assembly conveyor. These three lines can operate simultaneously, i.e. as one line deposits its package onto the assembly table, another line collects cover layers or carrier panels to bring them to the assembly table.

As mentioned, the several assembly tables are interconnected by an assembly conveyor, the electronic control system of the installation programming the conveyor to advance from one assembly line to the other as successive packages of layers are deposited on top of each other, the fully assembled multi-layer panel being delivered automatically to the panel press by the assembly conveyor.

A major advantage of this novel system is its flexibility in terms of adjustment for different panel compositions, due mainly to its "matrix" arrangment. Thus, it is possible to vary the number of separate layers on each side of the pressed panel independently, by simply increasing or decreasing the number of delivery palettes from which layers are collected in each collecting line. The collecting lines and their carriages are extremely simple in design and have been found to be reliable in operation, as well as comparatively simple as far as the needed electronic controls are concerned. When only a few layers, or only a single layer is applied to each side of the panel, it becomes possible to assemble several panel compositions at the same time, in order to supply a plurality of panels to a multi-level panel press. An increase in the number of levels of a given panel press does not constitute a major increase in investment cost, but greatly increases the output efficiency of the panel fabricating installation.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows.

DESCRIPTION OF THE PREFERRED EMBODIMENTS

Figure 1:
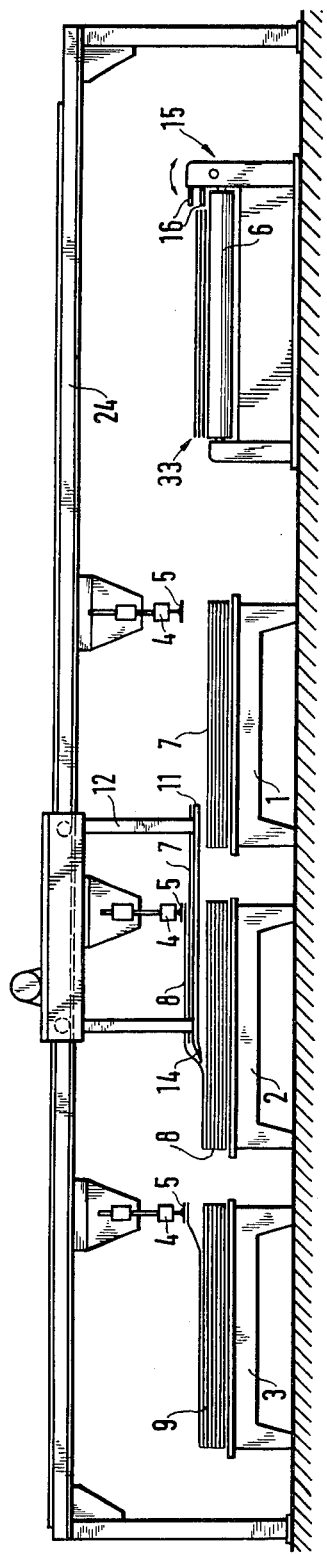
FIG. 1 illustrates, in a schematic elevational view, a layer collecting line as part of a panel fabricating installation embodiment of the invention.

In the several figures of the drawing are illustrated different embodiments of a device for collecting a plurality of different layers on an assembly table to form a package, the latter then being fed to a single-level or multi-level heater panel press for the fabrication of decorative panels, or for the composition of veneer panels, chipboard panels, fiber panels, plywood panels, plastic panels, metal panels, and the like.

Figure 2:
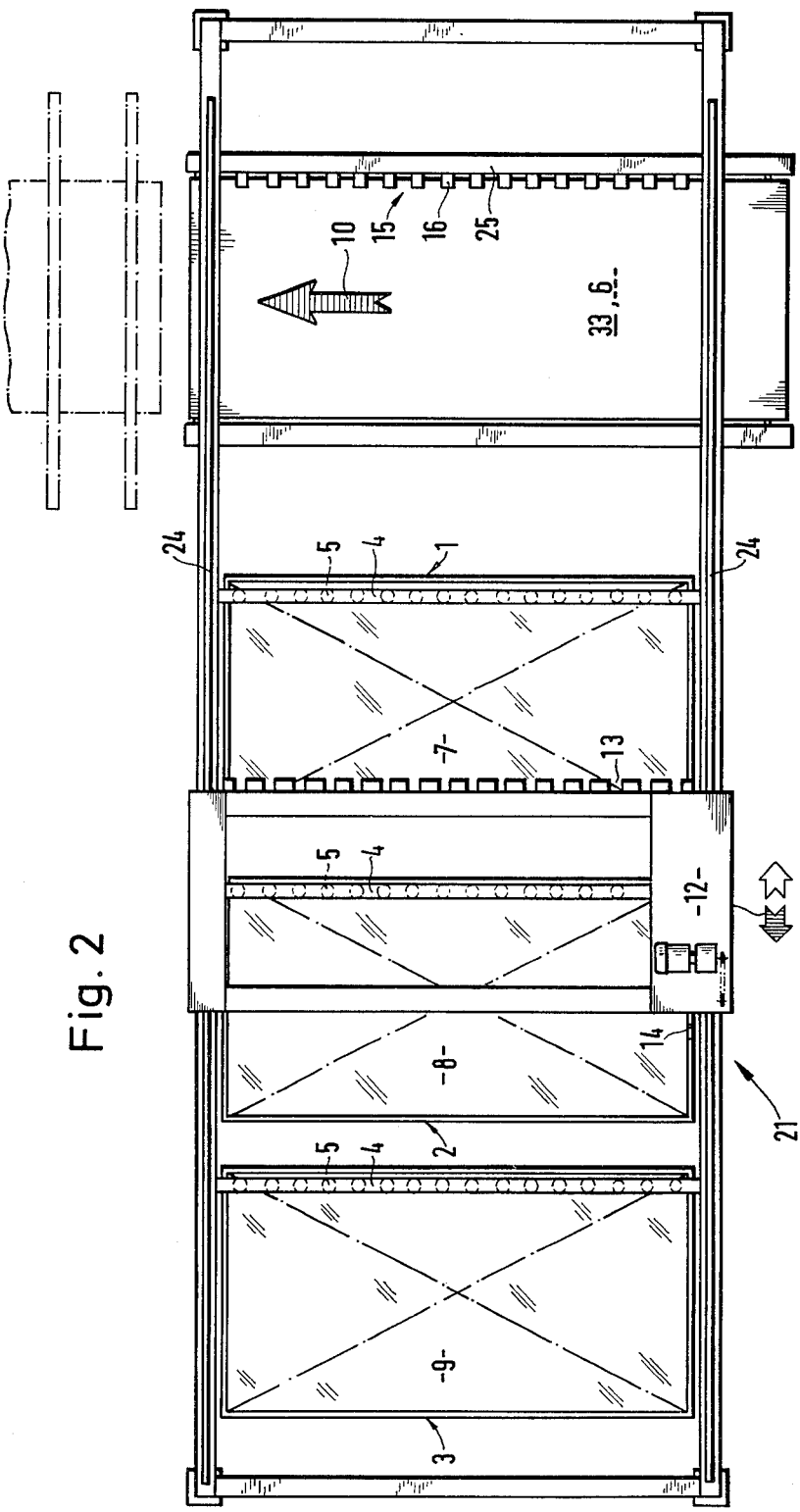
FIG. 2 is a plan view representation of the collecting line of FIG. 1.

In FIGS. 1 and 2 is illustrated, as part of a panel fabricating installation, a device for collecting different panel layers from three successive delivery palettes 1, 2, and 3 and for depositing these layers onto an assembly table 6 from where the layer package is advanced along the press feed axis 10 to a heater panel press. The feed axis 10 is perpendicular to the axis of the layer collecting line. The three delivery palettes carry a stack of layers 7, 8, or 9, respectively. Above the near edge of each layer stack is arranged a suction bank 4 which is movable vertically toward and away from the top of the layer stack, each suction bank 4 carrying a plurality of suction heads 5. These suction banks are supported on a pair of stationary supports between two longitudinal overhead rails 24. The outer side of these rails is engaged by a suspended collecting carriage 12 which has two carriage brackets moving laterally outside the delivery palettes and the suction banks 4, so as to be able to move past the latter. The collecting carriage 12 carries on the lower ends of its lateral brackets a transverse horizontal collecting palette 11 which reaches across the width of the delivery palettes and is arranged to pass underneath the suction heads 5 of each suction bank 4, when the latter is in its raised position.

The device operates as follows: At the start of a collecting run, the collecting carriage 12 is positioned to the right of the delivery palettes 1, 2 and 3, near the assembly table 6. The suction banks 4 are first lowered so that their suction heads 5 engage the near edges of the respective uppermost layers 7, 8, or 9, respectively. After suction is applied, the suction banks 4 are raised again, thereby lifting the near edges of the panel layers from their stacks, while leaving the major portion of each panel supported on top of the stack. The collecting carriage 12 with its collecting palette 11 is now advanced toward the first delivery palette 1, at a level at which the leading edge of the collecting palette engages the partially lifted layer 7 from underneath. A guide ramp 14 on the leading edge of the collecting palette 11 facilitates this entry and lifts the remaining portion of the layer 7, as the palette 11 advances under it, layer 7 being retained in the horizontal direction by the action of the suction heads 5. As soon as the collecting palette 11 is fully engaged underneath the layer 7, an abutment switch stops its motion, simultaneously cutting off the suction on the suction heads 5 and releasing the layer onto the palette 11. The collecting carriage 12 now advances to the second delivery palette 2, inserting the collecting palette 11 with the already collected layer 7 underneath the second layer 8. This procedure is repeated on each delivery palette until a package of layers is collected, whereupon the collecting carriage 12 is reversed in its motion moving back to the assembly table 6 in an accelerated return run.

The assembly table 6 is provided with a transfer clamp 15 which is arranged to engage the layer package 33 carried by the collecting palette 11, the transfer clamp 15 having a continuous upper clamping lip 25 and a series of lower clamping jaws 16 cooperating with matching recesses 13 in the near edge portion of the collecting palette 11. Thus, as soon as the transfer clamp 15 is closed, the collecting palette can be started on a new collecting run, the layer package 33 being retained on the assembly table 6, as the collecting carriage 12 moves again toward delivery palette 1. The transfer clamp 15 is arranged to be pivoted around a horizontal axis away from the layer package 33 to permit deposition of additional layer packages or panel components.

Figure 3:
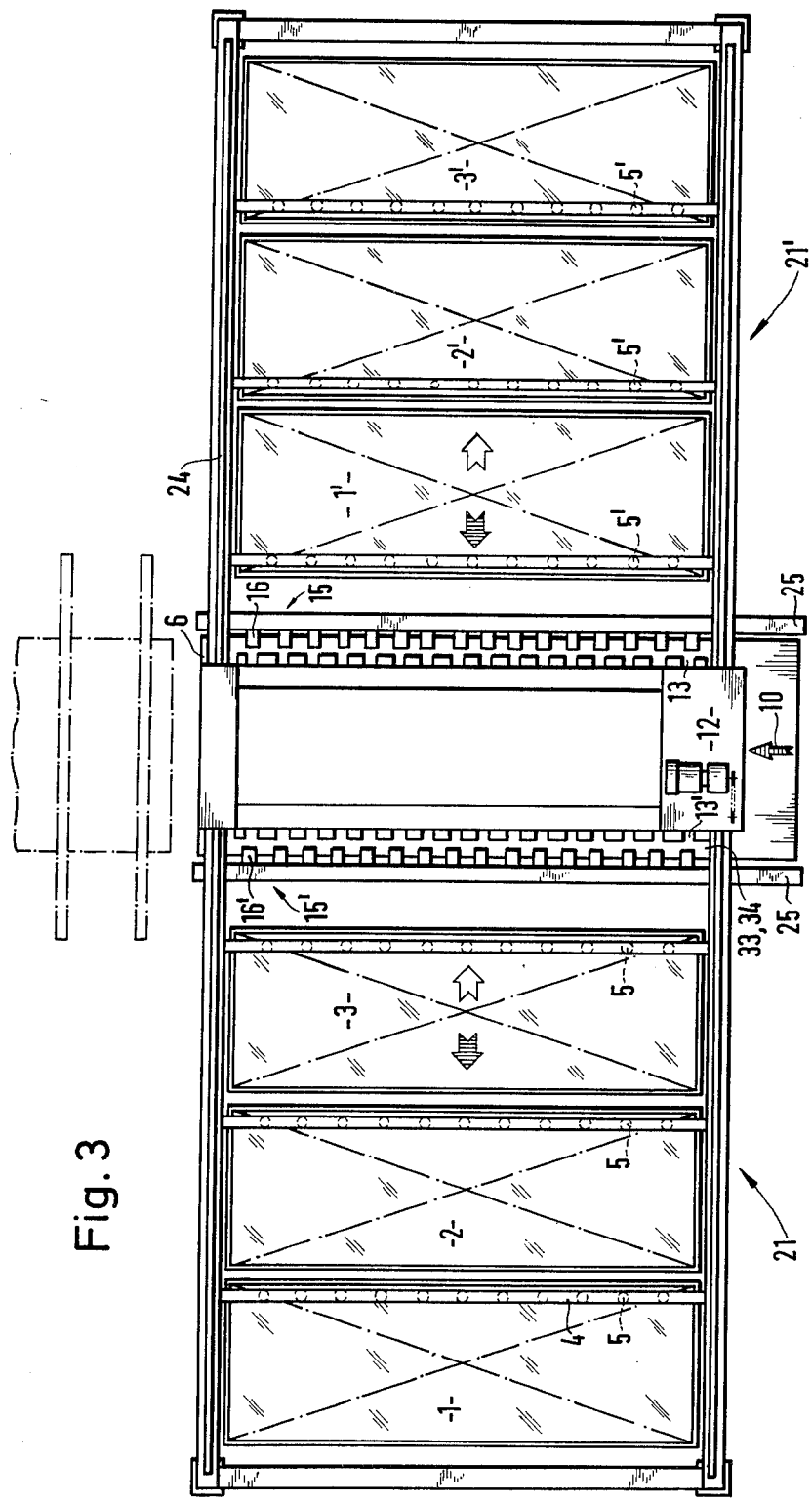
FIG. 3 is a plan view of a second embodiment of the invention comprising two collecting lines in opposite arrangement.

For a larger number of different layers, it is also possible to extend the collecting line to both sides of an assembly table 6, as is illustrated, for example, in FIG. 3. The various delivery palettes can be serviced either by a single collecting carriage, or, preferably, by two separate collecting carriages with collecting palettes 11 facing in opposite directions. Thus, while the bottom layer package 33 is collected along collecting line 21, a top layer package 34 is collected along the opposite collecting line 21' from delivery palettes 1', 2', and 3', respectively. The assembly table which receives layer packages from opposite collecting lines now requires transfer clamps 15 and 15' on each side, the transfer clamps being pivotable outwardly and downwardly so as not to interfere with the movements of the collecting palettes 11 and 11'. In the case of a single collecting carriage serving both collecting lines 21 and 21', its collecting palette 11 has to have recesses 13 and 13' on both edges, in order to accommodate the clamping jaws 16 of both transfer clamps 15 and 15'.

Figure 4:
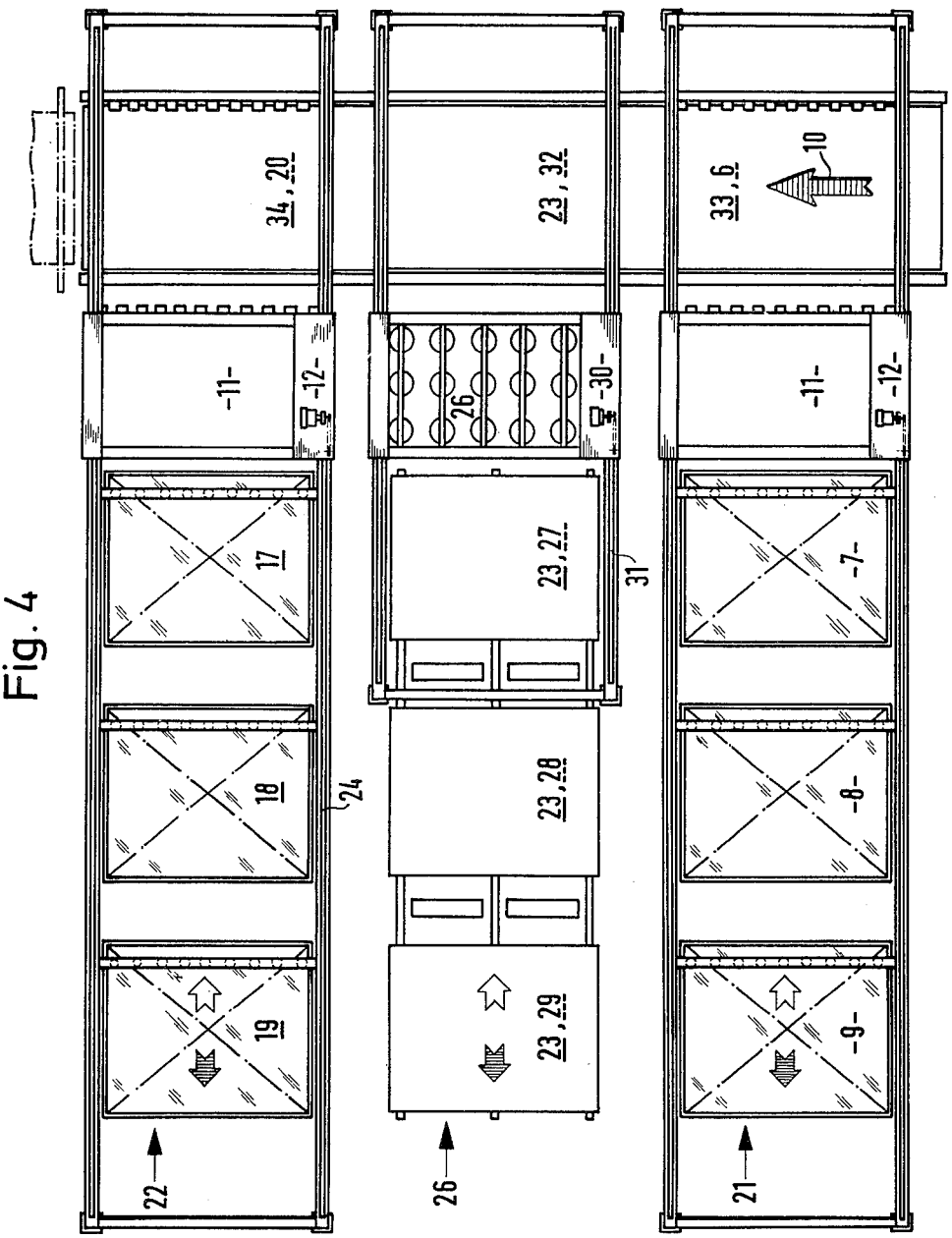
FIG. 4 illustrates a third embodiment of the invention with a matrix-type arrangement of three collecting lines.

In FIG. 4 is illustrated a third embodiment of the invention in which the panel layer collecting system is arranged in a "matrix" in respect to the main feed axis 10 for the heater panel press (not shown). In this arrangement, three parallel collecting lines 21, 26, and 22, each having an independent collecting carriage, run perpendicularly to three assembly tables 6, 32, and 20, respectively, the latter being arranged in succession along the press feed axis 10. In this case, a bottom layer package 33, consisting of layers 7, 8, and 9, is collected along collecting line 21 from delivery palettes 1, 2 and 3, respectively, intermediate carrier panels 23 are collected along the second collecting line 26 from delivery palettes 27, 28, and 29, respectively, and the top layer package 34, consisting of layers 17, 18 and 19, is collected along collecting line 22 and deposited on its assembly table 20. The central collecting line 26 of this arrangement is designed for the handling of carrier panels 23. The collecting carriage, rather than collecting from successive delivery palettes, picks up a single panel from palette 27 by means of a large suction plate 30 supported on the carriage, suitable palette conveying means linking the palette positions 27, 28 and 29. The three assembly tables 6, 32 and 20 are interconnected by an assembly conveyor which moves in the direction of the feed axis 10, thereby successively bringing together a bottom layer package 33, a carrier panel 23, and a top layer package 34, to form a complete layer package which is then advanced to the panel press.

Of course, the "matrix" arrangement of FIG. 4 could be expanded to both sides of the feed axis 10, in the manner shown and described in connection with the embodiment of FIG. 3.

A particular advantage resulting from this novel layer collecting method and device is the absence of any electrostatic charging of the layers, since the latter are no longer singulated from their stacks by drawing them away laterally, but are lifted vertically from the stack through the action of the suction heads and of the guide ramp of the collecting palette.

It should be understood, of course, that the foregoing disclosure describes only preferred embodiments of the invention and that it is intended to cover all changes and modifications of these examples of the invention which fall within the scope of the appended claims.

I claim:

1. A method of assembling a plurality of layers from separate layer stacks into a layer package for the production of layered pressed panels, like veneer panels, chipboard panels, fiber panels, plastic panels, metal panels, plywood panels, and the like, in a panel press, the method comprising the steps of:

lifting the uppermost layer from each of several separate layer stacks;

approaching a collecting palette horizontally against the first layer stack;

advancing the collecting palette in between the raised layer and said first layer stack, until it is positioned underneath said layer;

releasing the raised layer onto the collecting palette;

approaching the collecting palette with said first layer against the second layer stack;

advancing the collecting palette and the first layer in between the raised layer and said second layer stack, until they are positioned underneath said layer;

releasing the raised second layer onto said first layer on top of the collecting palette;

similarly picking up the uppermost layer from each remaining layer stack, thereby forming a layer package on top of the collecting palette;

returning the collecting palette with the layer package to an assembly table; and depositing the layer package onto the assembly table by holding the package by one of its edges and sliding the collecting palette out from under the package.

2. A layer assembling method as defined in claim 1, wherein:

the step of lifting the uppermost layers from several layer stacks involves initial raising of one layer edge only, so as to permit insertion of the collecting palette thereunder;

each step of approaching the collecting palette means that the layer stacks are approached from the side of the raised layer edge; and the steps of advancing the collecting palette underneath the separate layers involves in each case an initial advance in between each raised layer edge and its stack and the subsequent lifting of the remainder of the non-raised layer on top of the collecting palette and any layer carried thereon, through said advance of the collecting palette, while the layer in question is horizontally restrained.

3. A layer assembling method as defined in claim 1, wherein the step of lifting involves the use of suction means adapted to be lowered onto the top layer of a layer stack from above and to attach and lift said layer with the aid of suction.

4. A layer assembling method as defined in claim 1, wherein the successive method steps of lifting the uppermost layer, approaching and advancing the collecting palette, and releasing the layer are performed on several series of layer stacks by means of several collecting palettes.

5. A layer assembling method as defined in claim 4, wherein;

the step of returning the collecting palette and layer package to an assembly table involves a separate assembly table for each collecting palette; and the method further comprises the steps of transferring the first-deposited layer package from its assembly table onto the next assembly table;

depositing thereonto the layer package collected by the associated collecting palette;

transferring the combined layer packages to any subsequent assembly table and, accordingly, depositing further layer packages thereonto, until a complete panel package is obtained.

6. A device for the collection and assembly of a plurality of layers from separate delivery palettes into a layer package for the production of layered pressed panels, like veneer panels, chipboard panels, fiber panels, plastic panels, metal panels, plywood panels, and the like, in a panel press, the device comprising in combination:

an assembly table arranged in alignment with the panel press and defining a press feed axis;

a layer collecting line extending perpendicularly to the press feed axis and comprising therealong a succession of separate layer stacks;

a collecting carriage carrying a horizontally extending collecting palette and including means for moving the carriage and collecting palette along the layer collecting line over each layer stack and over the assembly table;

means for lifting from each layer stack the uppermost layer so as to permit insertion of the collecting palette and any layer carried on its upper surface under said raised layer; and means associated with the assembly table for transferring a collected package of layers from the collecting palette to the assembly table.

7. A layer collecting device as defined in claim 6, wherein the lifting means includes a stationary lifting unit above each layer stack, each lifting unit being arranged to lift only the edge of the uppermost layer on the approach side of the collecting palette, the lifting means further including guide means on the leading edge on the collecting palette which, as the palette advances under the partially raised layer, lift the remainder of the latter onto the collecting palette.

8. A layer collecting device as defined in claim 7, wherein each lifting unit includes a suction bank carrying a plurality of suction heads for engaging and lifting the layer by said edge, the suction bank being vertically movable away from the layer stack to permit passage of the collecting palette between the suction heads and the layer stack.

9. A layer collecting device as defined in claim 7, wherein:

the collecting carriage is suspended on two spaced overhead guide rails and includes vertical carriage brackets spaced apart so as to pass laterally outside the layer stacks;

the stationary lifting units are mounted between the carriage guide rails; and the carriage moving means is programmed to execute a collecting run which begins near the assembly table and includes: picking up a first layer from the closest stack of the collecting line, similarly picking up an additional layer from each successive stack, and returning to the assembly table with the package of collected layers.

10. A layer collecting device as defined in claim 6, wherein the transfer means of the assembly table includes a transfer clamp capable of engaging and horizontally holding the package of layers carried by the collecting palette, while the latter moves away from under said package.

11. A layer collecting device as defined in claim 10, wherein:

the transfer clamp is arranged near one of the edges of the assembly table which extend transversely to the collecting carriage motion, the clamp being pivotable around a horizontal transverse axis and including an upper clamping lip and a plurality of spaced lower clamping jaws; and the collecting palette includes matching recesses under the corresponding edge of the collected layer package to permit engagement of said edge by the clamping jaws.

12. A layer collecting device as defined in claim 6, further comprising:

a second layer collecting line extending in alignment with the first-mentioned collecting line in the opposite direction from the assembly table; and the moving means of the collecting carriage are arranged for travel of the carriage and collecting palette along both collecting lines.

13. A layer collecting device as defined in claim 6, further comprising:

at least one second layer collecting line with a series of layer stacks extending likewise perpendicularly to the press feed axis; and a separate collecting carriage and collecting palette with moving means associated with each additional collecting line, including layer lifting means for each layer stack.

14. A layer collecting device as defined in claim 13, further comprising:

a plurality of assembly tables, one for each collecting line, arranged in succession along the press feed axis; and wherein:

the several collecting lines are arranged in parallel alignment with one another and with their respective assembly tables, so that the layer stacks form a matrix pattern with respect to the press feed axis; and the layer package transfer means includes transfer means associated with each assembly table and conveying means for conveying transferred layer packages to the next assembly table in the direction of the panel press.

15. A layer collecting device as defined in claim 14, wherein:

the conveying means of the layer package transfer means is an endless conveyor running along the press feed axis in the direction toward the panel press above the several assembly tables.

* * * * *